United States Patent [19]
Fletcher et al.

[11] 3,902,971
[45] Sept. 2, 1975

[54] BIOLOGICAL DETECTING METHOD AND APPARATUS

[75] Inventors: James C. Fletcher, Salt Lake City, Utah; Charles E. Hendrix, Glendora, Calif.; Scott B. Kilner, Corona, Calif.; Frank W. Lehan, Santa Barbara, Calif.; Paul L. Magill, Los Altos, Calif.; Eli Mishuck, Arcadia, Calif.; William A. Perkins, Jr., Los Altos, Calif.; Merton A. Robinson, La Habra, Calif.; Keith H. Sweeny, West Covina, Calif.; Richard W. Tew, Azusa, Calif.

[73] Assignee: Akzona Incorporated, Asheville, N.C.

[22] Filed: May 20, 1965

[21] Appl. No.: 459,526

[52] U.S. Cl. ...... 195/103.5 R; 195/127; 195/DIG. 2
[51] Int. Cl. .............................................. C12k 1/04
[58] Field of Search .......... 195/103.5, 127; 23/230; 167/84.5

[56] References Cited
UNITED STATES PATENTS
3,128,239  4/1964  Page ................................ 195/103.5
3,129,144  4/1964  Page et al. ...................... 195/103.5

*Primary Examiner*—Stephen J. Lechert, Jr.
*Attorney, Agent, or Firm*—Francis W. Young; Philip M. Pipperger

[57] ABSTRACT

This disclosure describes apparatus and the method for continuously sampling either gaseous or liquid media such as atmosphere or water to detect the presence or absence of specific pathogenic microorganisms. The system as described employs collection apparatus which entrains particles of microorganism size in continuous flowing stream of water. A suspension of fluorescently tagged antibodies is injected into the flowing stream and thereby maintained in contact for a sufficient period of time for the specific antibodies to attach to any of its corresponding organism in the collection stream. The resultant mixture of the two streams is passed through a continuous filter having pore size selected to hold on its surface reacted antigen-antibody complexes while passing the remainder of the affluent. After washing to remove extraneous residue, the surface of the filter is exposed to light of a wavelength which excites the fluorescently tagged antibodies if resident on the tape, and the number of such fluorescent particles appearing in the field of a scanned field is counted. In the absence of any fluorescent particles, the original collection stream is known to be free of the particular microorganism. The disclosure describes specific antibody-antigen complexes and their recommended fluorescent dye and exciting wavelength. A wide band preamplifier for detecting the signals on the system is similarly disclosed.

19 Claims, 4 Drawing Figures

Fig. 1

BIOLOGICAL DETECTING METHOD AND APPARATUS

This invention relates to biological detection systems and more particularly to methods and apparatus for continuously monitoring gaseous or liquid media for particular micro-organisms and for providing a rapid indication of the presence and concentration of the micro-organisms in the medium.

A very real need existed, prior to this invention, for a system capable of continuously monitoring either the atmosphere or water or other fluid supplies to detect the presence of harmful micro-organisms. Detection is, of course, recognized as the first step in protective action. Examples of such needs are in the monitoring of the atmosphere of hospital operating rooms or municipal water supplies for such pathogens as Staphyloccus aureus, Mycobacterium tuberculosis, Shigella dysenteriae, Influenza virus, or Neisseria meningitidis. A major problem in the detection of such harmful micro-organisms or pathogens in normal urban air and water resides in the fact that the background count of inorganic particles, miscellaneous organic matter, and naturally occurring harmless micro-organisms, is extremely large as compared to a minimum pathogen count required to be detected for the system to be of value. Such a minimum required count may be as small as one pathogenic organism per liter of the gaseous medium monitored.

Coupled with the problem of minimum concentrations in a normal high background level is the need for such a system to have a short responsive time, e.g., 5 minutes or less from the time of sample taking to indication of the presence or absence of a predetermined pathogen level. This latter need eliminates from the realm of the useful, systems based upon the prior art detection techniques which involve the introduction of a sample of a medium possibly containing pathogens into an incubation chamber where the pathogens, fed by nutrients, multiply and normally develop clusters of observable size. In certain cases the nutrient carries a dye which is absorbed by the pathogen cluster, facilitating detection. The increase in detectability in these prior art attempts over observation of the original sample results primarily from the multiplication of the pathogen as compared with the inorganic matter in the sample. The time required for observable clusters to develop is in the order of several hours to several days, thereby completely eliminating the possibility of the use of such techniques for rapid pathogen detection.

One method of micro-organism detection of high specificity available heretofore is the fluorescent antibody technique. This technique involves the deposition and heat fixing of a bacteria-carrying sample on a laboratory slide, applying a drop of fluorescent-tagged antiserum to the fixed sample, allowing the antiserum to react with any of the specific pathogen present, washing off excess antiserum and thereafter observing the fluorescent particles under a microscope. This latter method of bacteria detection, similar to the culture methods, is slow and requires skilled operators for both the preparation and analysis of samples. From this brief description it should be clear that none of these prior art methods of micro-organism detection are adaptable to rapid continuous monitoring of fluid media.

With this understanding of the state of the prior art in mind, it is a general object of this invention to improve the detection of pathogenic micro-organisms.

Another object of this invention is to devise a method and apparatus for detecting pathogens in concentrations as small as one per liter of monitored fluid in less than five minutes.

One further object is to provide a rapid virtually automatic system employing fluorescent antibosy tagging for the detection and counting of specific pathogens.

Still another object is to provide a method for continuously reacting tagged antiserum with sampled water-entrained micro-organisms, selective filtering and observing the fluorescent particle residue.

These objects are all achieved following the teaching of this invention in apparatus comprising basically a collector-concentrator designed to draw samples of atmosphere at a predetermined continuous rate or at selected intervals, to remove particulate material greater than 5 microns in diameter and entrain the residue in a water stream. The effluent liquid is then mixed with a prepared fluorescent antiserum in a continuous fluid conduit in which the pathogens present are tagged or stained by the antigen-antibody reaction and are transported and deposited on the surface of a moving filter tape which passes unreacted antibodies and the aqueous carrier. The tape is thereafter transported to a sensing station where the surface carrying any pathogen-antibody complexes is illuminated and the fluorescent antibodies counted over a discrete interval and registered indicating the pathogen concentration. The system may include an alarm responsive to pathogen counts above a predetermined level. Alternately, where the source of medium to be detected is a liquid medium such as a water supply, the collector-concentrator is not required and the input to the system is simply a fluid conduit fed by the source to be monitored.

The method in accordance with this invention involves the continuous reaction of aqueous-borne micro-organisms with fluorescent-tagged antiserum followed by filtering to separate particulate material including stained reacted antibody-antigen complexes, illuminating the residue with radiation of wavelength causing the antibodies to fluoresce, and observing and counting the fluorescent antibodies.

One feature of this invention resides in the method and apparatus of introducing a flow of fluorescent-tagged antiserum into a fluid passage conducting micro-organism carrying fluid wherein the antigen-antibody reaction take place without agglutentation or clumping.

Another feature of this invention relates to the monitoring of the continuous antibody-antigen reaction by deposition of reacted fluid-borne antibody-antigen complex on a continuously moving filter tape, filtering to remove the unreacted antibodies, retaining the reacted particles, and scanning limited areas of the moving tape and recording the concentration of observed tagged antibodies.

These and other features of this invention may be more clearly understood from the following detailed description and by reference to the drawing in which:

FIG. 4 is a block diagram of the method of this invention.

Figure 1:
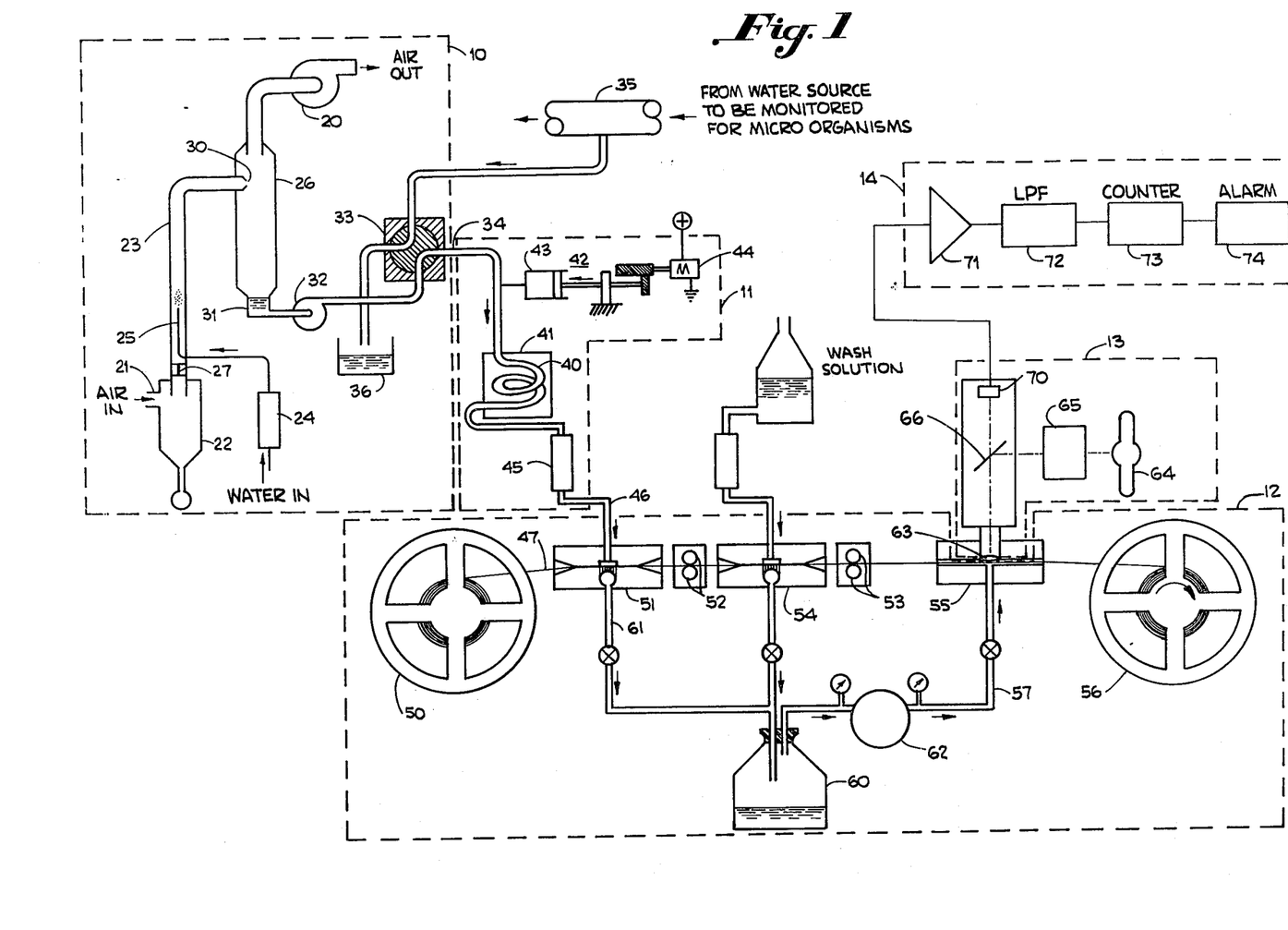
FIG. 1 is a simplified schematic diagram of the micro-organism monitoring system of this invention.

Now referring to FIG. 1, the detection apparatus of this invention comprises basically five subsystems, identified in the drawing by dashed lines, cooperating to continuously monitor potential sources of specific pathogens and record their concentration.

Briefly, the subsystems include:

1. A collection and concentration subsystem 10 designed to sample air or other local atmosphere, extract large size, 5 micron and over, particles, dissolve water soluble contaminants and entrain the residual particulate material, including micro-organisms, in an aqueous solution. The subsystem 10 also includes provision for directly monitoring water sources as well.

2. The second reactor or subsystem 11 combines the micro-organism-containing aqueous solution and a stream of previously prepared fluorescent-tagged antiserum. The mixed sample stream and antiserum are maintained, while passing through the subsystem, at a temperature for sufficient time to allow the antigen-antibody reaction to be virtually completed.

3. Next, is the filter tape transport subsystem 12, providing the functions of separating excess fluid, unreacted antibodies, and soluble contaminants from the micro-organisms and other residual particles having a mean diameter greater than the filter pore size. The filter tape transport subsystem also moves the deposited bacteria and particulate material from the outlet of the reactor subsystem to the next or optical subsystem 13.

4. The optical subsystem 13 provides for both the illumination and observation of the bacteria-carrying surface of the filter tape. The optical subsystem 13 includes a detector producing an electrical output signal having a form which indicates the presence and concentration of fluorescent particles present on the filter tape.

5. The electrical signal is used to drive the fifth or data handling subsystem 14 which registers and displays the count of specific micro-organisms present in the original source sampled.

The details of the subsystems and their operation are best understood considering the sequence of steps in continuously monitoring the atmosphere for such pathogens as *Staphyloccus aureus*, *Mycobacterium tuberculosis*, *Shigella dysenteriae*, influenza virus, or *Neisseria meningitidis*, which might be found in urban air.

The collection and concentration subsystem 10, through the operation of air pump 20, continuously draws local atmosphere through inlet 21 into a conventional cyclone separator 22 having a diameter in the order of 5 inches and other dimensions in the ratio to the diameter as taught in the Chemical Engineers Handbook, Third Edition (McGraw Hill) 1950 at page 1024, so that the cyclone is effective to remove particles greater than 5 microns in size and having a specific gravity of 2.0 or greater at an air flow in the order of 1000 liters per minute. The cyclone separator communicates with a collection tube 23 via an X-shaped anti-swirl vane 27 which prevents rotary motion of the air in the cyclone from extending into the collection tube 23. Water from a source unshown in the drawing is aspirated into the collection tube via a flow meter 24 and aspirator tube 25 extending into the collection tube 23.

Airborne micro-organisms and particles passing the cyclone separator 22 are entrained in the water droplets drawn out of aspirator tube 25 into the collection tube 23. The droplets are carried to a second separator 26 where they enter through an orifice 30, impact on the opposite side wall and run down the cylindrical and conical wall portions to a reservoir 31.

The water entraining residual particles is transferred via a pump 32 and a selector valve 33 to a conduit 34 and thence to the reactor subsystem 11.

The valve 33 allows the selective introduction of air or atmosphere-borne micro-organisms from the collection-concentration subsystem 10 or of water from a source 35 into the detection system. In the position shown, the valve 33 passes water-entrained materials from the collection-concentration subsystem 10 to the remainder of the system, while the alternate source 35 is connected to a sump 36. Upon 90° rotation, the valve 33 directs the stream from the subsystem 10 to the sump 36 and the stream from source 35 to the reactor subsystem. This arrangement allows the same basic system to be used for monitoring both gaseous and liquid sources of micro-organisms to be detected.

The collection-concentration subsystem is effective to sample air or other atmosphere introduced at the inlet at a rate as great as 1000 liters per minute with eighty-five to ninety-five percent of viable organisms introduced in nebulized form concentrated in the water stream output of the subsystem. Furthermore, tests establish that ninety percent or greater of the micro-organisms introduced in such manner are collected in less than one minute after termination of introduction. Such rapid operation of the collection-concentration subsystem is essential in order for the entire detection system to provide the rapid detection capability required.

The conduit 34 constitutes the sampling input to the reactor subsystem 11, the heart of the detection system. This subsystem comprises basically a continuous conduit reactor 40 for the aqueous sample in a temperature-controlled chamber 41 and an antiserum source 42 shown in the drawing as a syringe 43 driven by a motor 44. The syringe 43 injects a stream of prepared fluorescent-tagged antiserum into the conduit 34 where it is mixed with the collection stream and introduced into the reactor 40.

The reactor subsystem accomplishes the rapid tagging of specific micro-organisms with antibodies which are stained with fluorescent dye. Examples of suitable systems operative in this apparatus are:

| Antigen | Dye | Excitation Wavelength | Emission Wavelength |
|---|---|---|---|
| *Staphylococcus aureus* | (Fluorescein ( isothiocyanate | 290–400m$\mu$ | 538 |
| *Mycobacterium tuberculosis* | (Rhodamine B ( isothiocyanate | 320–480m$\mu$ | 598 |
| *Shigella dysenteriae* | (DANS (2,2'-dihydroxy | 290–400m$\mu$ | 525 |
| Influenza virus | ( azobenzene | | |
| *Neisseria meningitidis* | ( isothiocyanate | | |

These are representative only and not all-inclusive of systems directly applicable to the method and apparatus of this invention. It must be recognized that the detection of other antigens may be accomplished by the production of their specific antiserum tagging the antibodies with a dye of suitable emission properties.

Figure 2:
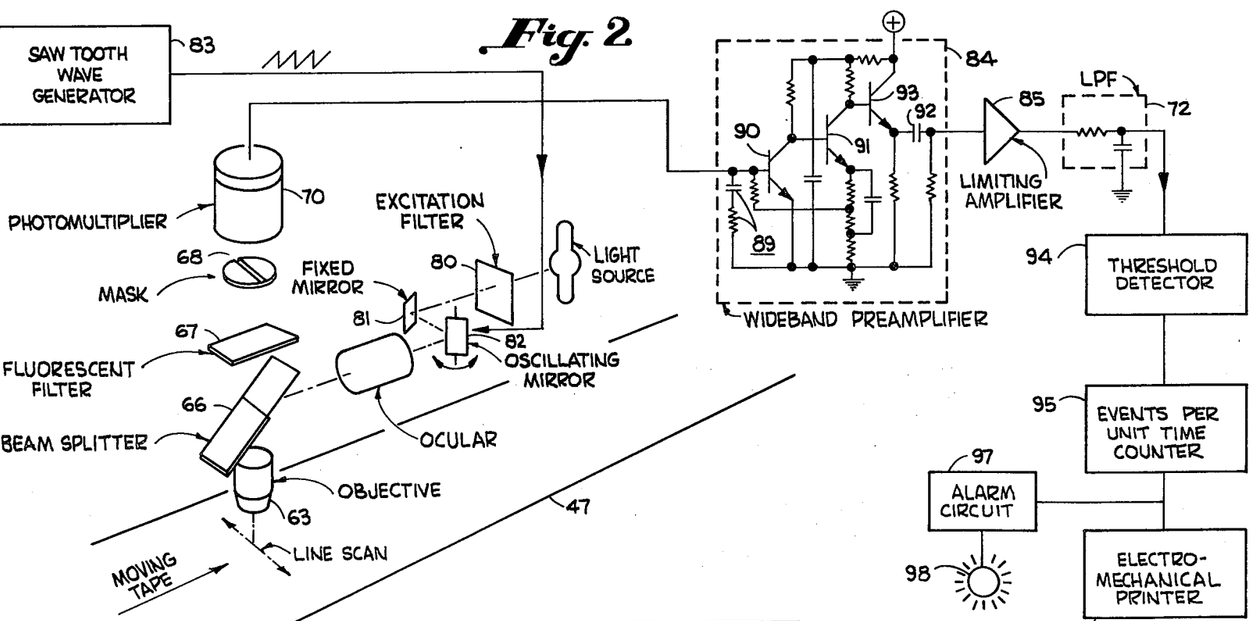
FIG. 2 is a simplified functional schematic of the optical and electrical subsystems of the system of FIG. 1.
Figure 2F:
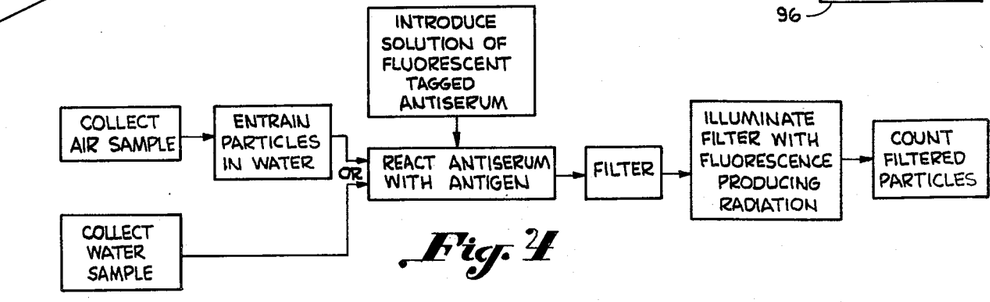

The tagged antiserum may be produced in a number of procedures described in the literature ranging from the early work of Albert Coons (Coons, A. H., Creech, H. J., Jones, R. N. and Berliner, G., Journal of Immunology, Vol. 45, pages 159–170, 1942) in preparing protein conjugates, to the use of fluorescein isothiocyanate as introduced by J. L. Riggs in 1958 (Riggs, J. L., Seiwald, R. J., Burckhalter, J., Downs, C. M., and Metcalf, T. G., American Journal of Pathology, Vol. 34, pages 1081–1097, 1958) and more recent procedures the following of which is exemplary for producing fluorescein-tagged antiserum specific to *Bacillus globiqie*:

Rabbits immunized by various routes (e.g. by a schedule of intravenous injections) were exsanguinated. Immune serum was separated from the blood by centrifugation. The globulin fraction was isolated by re-precipitation with saturated ammonium sulfate solution from the serum dissolved in phosphate-buffered saline solution. This fraction was reacted with excess fluorescien isothiocyanate for, for example, 22 to 24 hours at 5°C. The resulting FITC-tagged antibody was purified by Sephadex absorption, clarification and filtration. The important parameters of the immunization step include: the type of animal, immunization route, inoculation schedule, and possible use of adjuvants. In further steps, selection of the method of fractionating serum, the reaction procedures and methods and conditions of purification of the final product are well known to those skilled in the art of antiserum production.

It has been discovered in the making of this invention that the mixing of fluorescein-stained antiserum with the collection stream for a period in the order of two minutes at a temperature in the order of 25°C results in approximately one-hundred percent of specific antigens reacting with the antiserum. This discovery in itself constitutes a truly significant advance over the prior art slide staining technique and establishes the practicality of this system.

The reactor subsystem 11 provides the required reaction time simply in the form of a helical conduit 40 of sufficient length that the time for passage of the mixed antiserum and collection water through the temperature controlled chamber 41 at the system flow rate equals the required reaction time. Flow is controlled by a flow-control valve 45. The tagged fluid from the reactor subsystem is conveyed by conduit 46 to the tape transport subsystem 12 which filters the stained microorganisms onto the surface of a moving tape 47, washing away excess stain and transporting the microorganisms to a scanning station.

The transport subsystem 12 carries a flexible 16mm wide filter tape 47 having a nominal 0.45 micron pore size. A recommended filter is the type HA Millipore tape of the Millipore Company of Bedford, Mass. The transport subsystem includes a supply reel 50, a filter station 51, rolls 52 and 53, a wash station 54, a tape positioner 55 under the optical subsystem 13, and a take-up reel 56, all positioned in sequence along the path of tape travel. A waste collector 60 collects the filtrate from station 51 and wash solution from station 54.

With the system in normal operation and with a constant flow of fluid from conduit 46 and the tape 47 advancing at a constant rate by driving motors unshown in the drawing, reacted organisms are deposited on the upper surface of the tape 47 as it passes through the filter station 51 with the filtrate passing through the tape 47 flowing through conduit 61 to waste collector 60. The tape carrying deposited micro-organisms and residual matter is next washed by the passage through the tape 47 of a buffer solution consisting of 0.5M bicarbonate solution which washes any residual unreacted antiserum into the collector 60. Both the deposition of bacteria at the filter station 51 and washing at the station 54 are assisted by a vacuum of approximately twenty-five inches of mercury maintained at the collector 60 by an air pump 62.

Beyond the wash station 54 the tape passes between a pair of drive rollers 53 to the tape positioner 55 which maintains the upper surface of the tape 47 in fixed position relative to the objective lens 63 of the optical subsystem 13. A positive air pressure from pump 62 applied to the underside of tape 47 through conduit 57 insures fixed registration between the upper surface of the tape 47 and objective lens 63. The tape 47 after passage under the optical subsystem 13 advances to the take-up reel 56.

The optical subsystem 13 illuminates the tape 47 as it passes under the objective lens 63 while detecting fluorescent emission from the reacted antibodies on the surface of the moving filter tape 47. The optical subsystem 13 is described more completely in connection with FIG. 2, however, as shown in FIG. 1 it comprises basically a light source 64, preferably an arc lamp producing a high intensity arc predominently in the blue, violet and near ultraviolet ranges, directed through a scan system 65 to a beam-splitting mirror 66 which reflects the high intensity pinpoint of light through the objective lens 63 to the tape 47. Fluorescent-tagged antibodies on the tape 47, as they are scanned by the high intensity flying spot of light, emit radiation transmitted through the objective lens 63 and beam-splitting mirror 66 to a detector 70.

The detector 70, continuously operative and sensitive to emitted radiation from the tape surface, is connected to an amplifier 71 of the data handling subsystem 14 amplifying and limiting the detected signals and applying them through a low-pass filter 72 to a counter 73 for registration of the number of pulses corresponding to the number of fluorescent particles on the tape. The counter 73 when connected with a suitable timing source can register particles per unit of time detected and operate an alarm 74.

The operation of the optical and data handling subsystems is illustrated in FIG. 2 in which the moving filter tape 47 is shown moving under the objective lens 63. The illumination for the tape is a moving light spot originating at the light source 64 which is preferably a high-pressure mercury arc lamp such as the type 109 of the PEK Company of Sunnyvale, California, producing a high intensity arc (130,000 candles/cm$^2$) 0.03 to 0.1cm in diameter. The arc having predominant emission in the 300–450m$\mu$ wavelength range is directed through a filter such as the Corning 5543 (5-60) filter having transmission band limited to the 300–500m$\mu$ range to the scan system 65. The latter includes a fixed mirror 81, an oscillating mirror 82 and a drive generator 83 for the oscillating mirror. It has been found that the oscillating mirror, commercially available Consolidated Electrodynamics Corporation Type 7-317 galvanometer mirror, provides a suitable moving element for directing the beam from the lamp 64 over a linear detection path transverse to tape movement at rates up to 2,200cps. This oscillating mirror 82 is driven by a suitable signal source such as a sawtooth wave generator 83 having a repetition rate equal to the designed scan rate, and a field magnet unshown in the drawing but positioned to produce the deflecting field for the oscillating mirror 82. The beam from lamp 64, as indicated by the dashed lines in the drawing, is directed by the mirrors 81 and 82 into the ocular lens of the optical system, including the beam-splitter 66 and objective lens 63. The system has a magnification of one thousand and since the illumination source is in the order of 0.1cm in diameter, its image transmitted through the system from ocular to objectives is demagnified to produce approximately a one micron spot which moves in a line scan across the tape upon movement of the mirror 82.

The beam-splitting mirror 66 may be either a half-silvered or a dichroic mirror, the latter having high reflectance in the blue portion and high transmittance in the yellow portion of the visible spectrum. The dichroic mirror is preferred since it avoids the loss of light intensity in half-silvered mirrors which occurs upon two passes through fifty percent transmission medium.

Emitted fluorescent radiation from tagged particles on the tape, transmitted through the objective lens 63 and beam-splitting mirror 66, passes through a fluorescence filter 67, such as type Wratten 16, passing wavelengths above approximately 520 m$\mu$. This filter 67 with excitation filter 80 having mutually exclusive transmission bands, and mirror 66, cooperate to effectively isolate the excitation and fluorescent radiation in the optical system.

Figure 3:
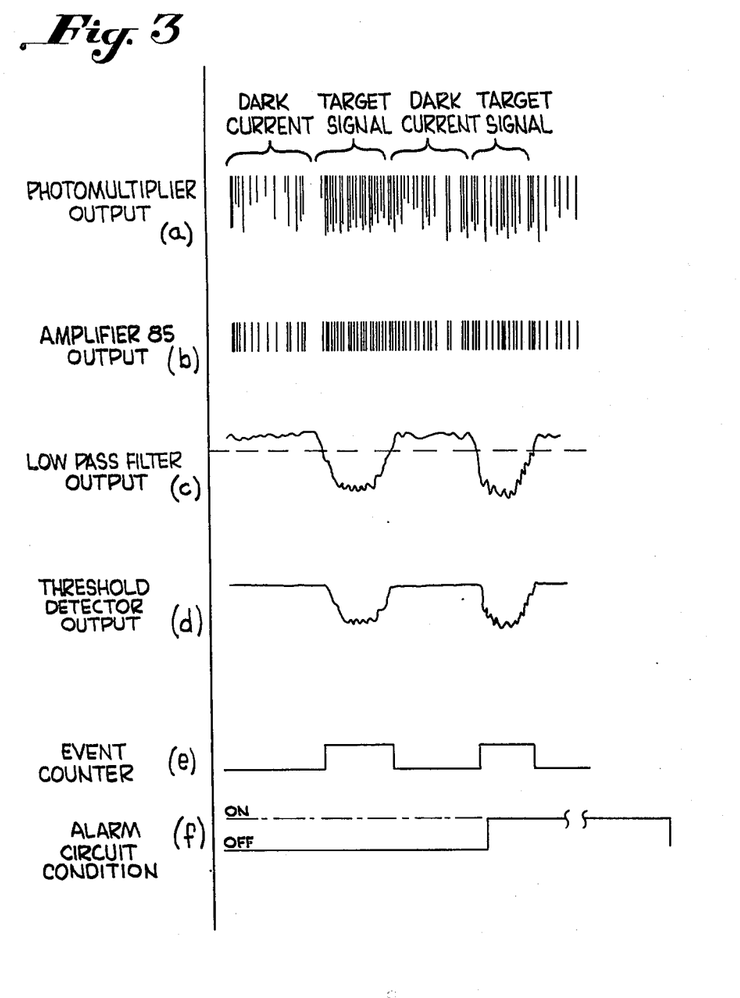
FIG. 3 is a graphical representation of the electrical signals processed by the system in detecting the presence of tagged micro-organisms.

Fluorescent radiation passing the filter 67 next passes through a narrow slit of mask 68 aligned with the scan path and thence to the detector 70, a photomultiplier such as the type 9558B tube of Electra Megadyne, Inc., London, England. The photomultiplier 70 produces a series of discrete pulses appearing at random times and with a random distribution of pulses heights even in the absence of an emitting particle on the tape 47, as illustrated in FIG. 3(a) by the dark current regions. The time of occurrence of a particular pulse or its amplitude is independent of target presence but the average rate of pulse occurrence is a function of the incident light intensity which changes as the flying spot illuminates a fluorescent particle. It is apparent that the electronic data handling subsystem must process the output signal from the photomultiplier, responding to changes in average pulse rate, to extract only the valid indications of emitting particles.

We have produced such an electronic subsystem employing first a wide-band pre-amplifier having a low (zero) input impedance and driving a commercially available wide-band clipping-amplifier 85 such as the type H plug-in oscilliscope amplifier of the Techtronix, Inc. of Portland, Oregon. the amplifier 85 preferably has a high voltage gain, e.g., 100, and good frequency response from 0 to 11 megacycles per second. The pre-amplifier 84, designed specifically to meet the requirements of this detection system, comprises a pair of directly coupled NPN transistors 90 and 91 with negative feedback from the emitter of transistor 91 to the base of transistor 90. Signals from the detector 70 are applied to the base of transistor 90 while the amplified output of the pre-amplifier 84 is taken via a capacitor 92 connected to an emitter-follower transistor 93, which in turn is directly coupled to the collector of transistor 91. The input impedance of the pre-amplifier 84 is maintained at a uniform minimum impedance by the combination of the feedback between transistors 91 and 90 and a shunt input RC network 89 having a time constant in the order of one second.

Signals from detector 70, amplified and limited in pre-amplifier 84 and limiter 85 as illustrated in FIG. 3(b), are passed through RC low-pass filter 72 to a threshold detector 94 of conventional configuration which, as shown in FIG. 3(d), passes only the portion of the low frequency enveloped above, or in this case below, a selected reference, the dashed line in FIG. 3(c). The signal output of the threshold detector corresponding in time to the target signal intervals, is applied to a pulse counter 95, such as Beckman Instruments Model 5230 Universal EPUT and timer. The counter 95 will register and display visually the total target count in any interval of time, drive a conventional electromechanical printer 96 or trigger an alarm circuit 97 operating a visual or audible alarm 98 whenever the count of particles exceeds a specific minimum in a selected time interval. As shown in FIG. 3(f) the alarm is operated by the detection of the second of two particles in the selected time interval.

The detection system herein described provides automatic monitoring of gaseous or liquid media for virtually any bacteria, virus or other micro-organism subject to the antigen-antibody reaction, using a tagged antibody. This invention is the result of several significant advances in the state of the art. Specifically, this invention is made possible by the development of:

1. a water scrubbing method of continuously sampling large volumes of air, concentrating micro-organisms present in a small volume of water, and dissolving soluble background particulates;

2. the discovery that the antigen-antibody reaction can be continuously produced without clumping or agglutination by the addition of antiserum to a stream carrying collected antigens;

3. the development of apparatus for continuously collecting the resultant tagged micro-organisms on a moving microporous filter tape with residual unreacted tagged antiserum washed away;

4. the method of detecting tagged antibodies by illuminating the surface of the filter with a moving spot of radiation producing fluorescence; and 5. the development of circuitry to accurately process the change in fluorescent emission on the filter surface upon the passage of a tagged particle.

These advances are all combined in the apparatus described above as well as the process as shown in FIG. 4. It is to be recognized that this apparatus and the method described herein illustrate the principles of this invention and that one skilled in the art, following our teaching, can devise other variants without departing from the spirit of our invention. The exclusive rights granted hereunder, therefore, are not limited to the embodiments illustrated, but rather by the scope of the invention as defined by the following claims and the equivalents thereof:

What is claimed is:

1. A system for detecting micro-organisms comprising:

means for sampling a fluid medium to be monitored for specific micro-organisms;

a source of antiserum containing tagged antibodies capable of reacting with the specific micro-organisms;

means for introducing the antiserum into a stream of the sampled fluid medium;

means for maintaining the mixed sample and antiserum stream at a temperature for a period of time sufficient for the micro-organisms present and antibodies to react;

filter means for separating on the surface thereof particulate material including reacted micro-organisms;

means for dispensing the stream of mixed sampled fluid medium and antiserum onto the surface of the filter means;

means for illuminating the surface of the filter with radiation causing the tagged antibodies to be observable; and means for counting the tagged antibodies.

2. A detection system for air-borne micro-organisms comprising:

an air sampler;

means for separating from the air to be sampled particulate material larger than the mean dimensions of the micro-organisms to be detected;

means for aspirating a spray of water into the sampled air to entrain therein residual particulate material including micro-organisms;

a collector for the aspirated water and micro-organisms, including a conduit for producing a continuous stream of micro-organism-carrying water;

means for introducing tagged antiserum containing antibodies specific to the micro-organisms into the stream of micro-organism-carrying water;

means for maintaining the mixed sample and antiserum stream at a temperature for a period of time sufficient for the micro-organisms present and antibodies to react;

a microporous filter having pore size to retain micro-organisms on the surface thereof;

means for passing the collected water through the microporous filter to separate the reacted antibody-micro-organism complexes from the residual fluid; and means for scanning the surface of the filter for tagged organisms.

3. A system for monitoring atmosphere for specific micro-organisms, comprising:

means for sampling the atmosphere to be monitored;

means for separating particulate material above the size of such micro-organisms;

means for entraining the residual particulate material including micro-organisms into a stream of an aqueous solution;

a source of antiserum containing tagged antibodies capable of reacting with the micro-organisms to be detected;

means for continuously introducing the antiserum into the stream of aqueous solution;

means for maintaining the mixed stream of solution and antiserum at a temperature for a period of time sufficient for micro-organisms present to react with tagged antibodies;

means for depositing the reacted antibody-micro-organism complex from the stream on the surface of a porous filter tape;

means for illuminating discrete areas of the surface of the filter tape with radiation causing the tagged organisms to be observable; and means for counting the observable tagged organisms in each discrete area.

4. A detection system for micro-organisms comprising:

means for sampling a fluid medium to be monitored for particular micro-organisms;

means for entraining particulate material of the sample of the medium in an aqueous carrier stream;

a source of tagged antiserum containing antibodies specific to the micro-organisms to be detected;

means for continuously introducing the tagged antiserum into the aqueous carrier stream;

conduit means for transporting the mixed streams while maintaining the particulate-carrying aqueous carrier and antiserum at a temperature for sufficient time for the antibodies and micro-organisms to react;

a filter tape having a pore size retaining reacted micro-organism-antibody complexes on the surface thereof while passing unreacted antiserum;

means for passing the aqueous carrier and antiserum stream through the filter tape;

means for advancing the filter tape to present successive areas of the tape of the aqueous carrier;

flying spot scanning means positioned to illuminate localized areas of the surface of the filter tape with radiation causing the tagged antibodies of each antibody-micro-organism complex to be visible;

means for detecting visible complexes as illuminated by the flying spot scanning means; and means for counting visible complexes.

5. The combination in accordance with claim 4 wherein both the filter means is advanced and the flying spot scanning means illuminates sequential areas of the filter means at rates related to the fluid medium sampling rate whereby the count of visible antibodies per unit of time of said counting means indicates the concentration of micro-organisms.

6. Apparatus for counting micro-organisms comprising:

means for injecting antiserum containing tagged antibodies specific to the micro-organism into a fluid stream containing the micro-organisms to be counted;

conduit means for transporting the fluids while maintaining the mixed antiserum and fluid stream at reaction temperature for a period sufficient to allow the antibody-antigen reaction to occur;

filter means at the outlet of said conduit means for separating reacted antibody-micro-organism complexes from the fluid medium and unreacted antiserum; and means for counting the tagged antibodies.

7. The combination in accordance with claim 6 wherein said counting means includes a source of illumination causing the tagged antibodies to be visible and photo-responsive means for counting the visible antibodies.

8. The combination in accordance with claim 6 wherein the antiserum contains antibodies tagged with fluorescent dye and the source of illumination produces radiation of wavelength producing fluorescent emission from the tagged antibodies.

9. Apparatus for identifying specific micro-organisms in a fluid medium comprising:
   a conduit for carrying the fluid to be sampled;
   means for injecting into the fluid medium carrying conduit a stream of antiserum containing tagged antibodies specific to the micro-organisms to be identified;
   filter means for separating from the fluid medium the particulate material of the order of size of the micro-organism while retaining in the fluid medium unreacted antiserum; and
   means for examining the separated material for tagged antibodies.

10. A method of detecting micro-organisms comprising the steps of:
    extracting a sample stream of a fluid medium to be monitored for micro-organisms;
    mixing the sample stream with a stream of tagged antiserum containing antibodies specific to the micro-organisms to be detected;
    maintaining the mixed streams at reaction temperature for sufficient period of time for the antibodies and micro-organisms to react;
    depositing the reacted micro-organism-antibody complexes on a porous carrier capable of retaining on the surface thereof micro-organisms while passing unreacted antiserum;
    illuminating the complexes with radiation causing the tagged antibodies to be visible; and
    observing the visible antibody-micro-organism complexes.

11. A method of detecting micro-organisms comprising the steps of:
    extracting a sample of a fluid medium to be monitored for micro-organisms;
    mixing the sample with a fluid antiserum containing antibodies tagged with fluorescent material;
    maintaining the sample and antiserum at a temperature of 25°C for a period of one to two minutes to allow the fluorescent-tagged antibodies and micro-organisms to react;
    passing the mixed sample and fluid antiserum through a filter to separate the micro-organisms and residual particulate material from the unreacted antibodies and filtrate;
    illuminating the filter with radiation causing the tagged antibodies to fluoresce; and
    counting the fluorescent particles.

12. A method of detecting atmosphere-borne micro-organisms comprising the steps of:
    entraining the particulate material and micro-organisms of a sample of atmosphere in a stream of water;
    mixing the stream of water with a stream of fluid antiserum containing fluorescent-tagged antibodies;
    maintaining the mixed stream and antiserum at a temperature for a sufficient period of time for the tagged antibodies and micro-organisms to react;
    passing the resultant fluids through a filter retaining particulate material including the reacted antibody-micro-organism complexes;
    illuminating the surface of the filter to cause the tagged antibodies to fluoresce; and
    counting the fluorescing particles.

13. A method of detecting the concentration of particular micro-organisms in a fluid medium comprising the steps of:
    sampling the fluid medium at a predetermined rate;
    mixing the stream of sampled medium with a stream of antiserum containing tagged antibodies specific to the micro-organisms to be detected;
    maintaining the mixed streams at a temperature for a period of time sufficient for the tagged antibodies and micro-organisms present to react;
    passing the mixed streams at a constant rate through discrete areas of filter medium having pore size which retains micro-organisms and passes the fluid filtrate;
    illuminating local areas of the surface of the filter medium with radiation causing the tagged micro-organisms to be visible; and
    counting the number of visible micro-organisms in each discrete area to indicate the micro-organism concentration.

14. A method of detecting the concentration of particular micro-organisms in the atmosphere comprising the steps of:
    sampling the atmosphere at a predetermined constant rate;
    separating particulate material of size greater than the mean size of the micro-organism to be detected;
    entraining the residual particulate material including micro-organisms in a fluid medium;
    mixing at a constant rate a stream of the fluid medium with a stream of antiserum containing tagged antibodies specific to the micro-organisms to be detected;
    maintaining the mixed streams at a temperature for a period of time sufficient for the tagged antibodies and micro-organisms to react;
    passing the resultant stream through a porous filter having a pore size which passes the filtrate and retains the reacted micro-organism-antibody complexes on the surface thereof;
    illuminating in sequence local areas of the filter surface of size approximating the nominal diameter of a single such complex; and
    counting the number of discrete complexes visible.

15. The method in accordance with claim 14 wherein the mixed streams are deposited on progressive areas of a porous filter whereby the number of complexes detected per unit area is an indication of the micro-organism concentration of the atmosphere.

16. The method in accordance with claim 14 wherein the tagged complexes are illuminated with radiation of wavelength causing the tagged antibody to exhibit distinct emission as compared with background particulate material.

17. The method in accordance with claim 16 wherein the complexes are tagged with fluorescein isothiocyanate and are illuminated with radiation in the blue-violet range of the visible spectrum.

18. A method of staining micro-organisms comprising:
    entraining micro-organisms to be stained in a fluid medium;
    mixing the medium with an antiserum containing stained antibodies specific to the micro-organism to be detected; and maintaining the mixed fluid medium and antiserum at a temperature for a period of time sufficient for the micro-organisms and tagged antibodies to react.

19. A method of staining micro-organisms comprising:

entraining micro-organisms to be stained in an aqueous stream;

mixing the stream with a stream of antiserum containing stained antibodies;

maintaining the mixed streams at a temperature for a period of time sufficient for the micro-organisms and antibodies to react; and separating the reacted complexes from the residual unreacted antiserum.

* * * * *

UNITED STATES PATENT OFFICE
CERTIFICATE OF CORRECTION

Patent No. 3,902,971   Dated September 2, 1975

Inventor(s) James C. Fletcher et al.

It is certified that error appears in the above-identified patent and that said Letters Patent are hereby corrected as shown below:

Change Item [73] in the Heading to read:

--Said Robinson assor. to Beckman Instruments, Inc., Fullerton, Calif., a Corp. of California;

said Perkins and Magill assors. to Metronics Associates, Inc., Palo Alto, Calif., a Corp. of California;

said Kilner, Fletcher, Hendrix, Lehan, Mischuck, Sweeny, and Tew assors. by mesne assignments to Akzona Incorporate Asheville, N. C., a Corp. of Delaware--.

Signed and Sealed this

Twenty-fourth Day of August 1976

[SEAL]

Attest:

RUTH C. MASON  
Attesting Officer

C. MARSHALL DANN  
Commissioner of Patents and Trademarks